(12) United States Patent
Frederick Janecka et al.

(10) Patent No.: US 12,228,312 B1
(45) Date of Patent: Feb. 18, 2025

(54) TWO AXIS SOLAR PANEL TRACKING SYSTEM USING ROTATIONAL AND AXIALLY LONGITUDINAL MOTION

(71) Applicants: Charles Frederick Janecka, Houston, TX (US); Nathanael Steven Banda, Elgin, TX (US)

(72) Inventors: Charles Frederick Janecka, Houston, TX (US); Nathanael Steven Banda, Elgin, TX (US)

( * ) Notice: Subject to any disclaimer, the term of this patent is extended or adjusted under 35 U.S.C. 154(b) by 0 days.

(21) Appl. No.: 18/654,146

(22) Filed: May 3, 2024

(51) Int. Cl.
*F24S 30/455* (2018.01)
*F24S 50/20* (2018.01)
*F24S 30/00* (2018.01)
*H02S 20/32* (2014.01)

(52) U.S. Cl.
CPC ............ *F24S 30/455* (2018.05); *F24S 50/20* (2018.05); *F24S 2030/115* (2018.05); *H02S 20/32* (2014.12)

(58) Field of Classification Search
CPC .... F24S 30/455; F24S 50/20; F24S 2030/115; H02S 20/32
See application file for complete search history.

(56) References Cited

U.S. PATENT DOCUMENTS

| 9,729,102 B2 | 8/2017 | Pizzarello et al. | |
|---|---|---|---|
| 2012/0125401 A1* | 5/2012 | DeVillier | H02S 20/10 136/246 |
| 2012/0279486 A1* | 11/2012 | Sakai | F24S 30/48 359/872 |
| 2014/0069481 A1* | 3/2014 | Eom | F24S 30/48 136/246 |

* cited by examiner

*Primary Examiner* — Michael Y Sun
(74) *Attorney, Agent, or Firm* — Walter J. Tencza, Jr.

(57) ABSTRACT

An apparatus including a solar panel having a first end and a second end, wherein the second end is opposite the first end; a first cylinder having a first end rotatably connected to the solar panel at a first pivot point; a second cylinder having a first end rotatably connected to the solar panel at a second pivot point which is different from the first pivot point; a support beam having a first end rotatably connected to the solar panel at a third pivot point which differs from the first and second pivot points and which is between the first and second pivot points; and a base. The first cylinder is configured to raise or lower the first end of the solar panel; while the second cylinder is configured to lower or raise, respectively, the second end of the solar panel.

5 Claims, 10 Drawing Sheets

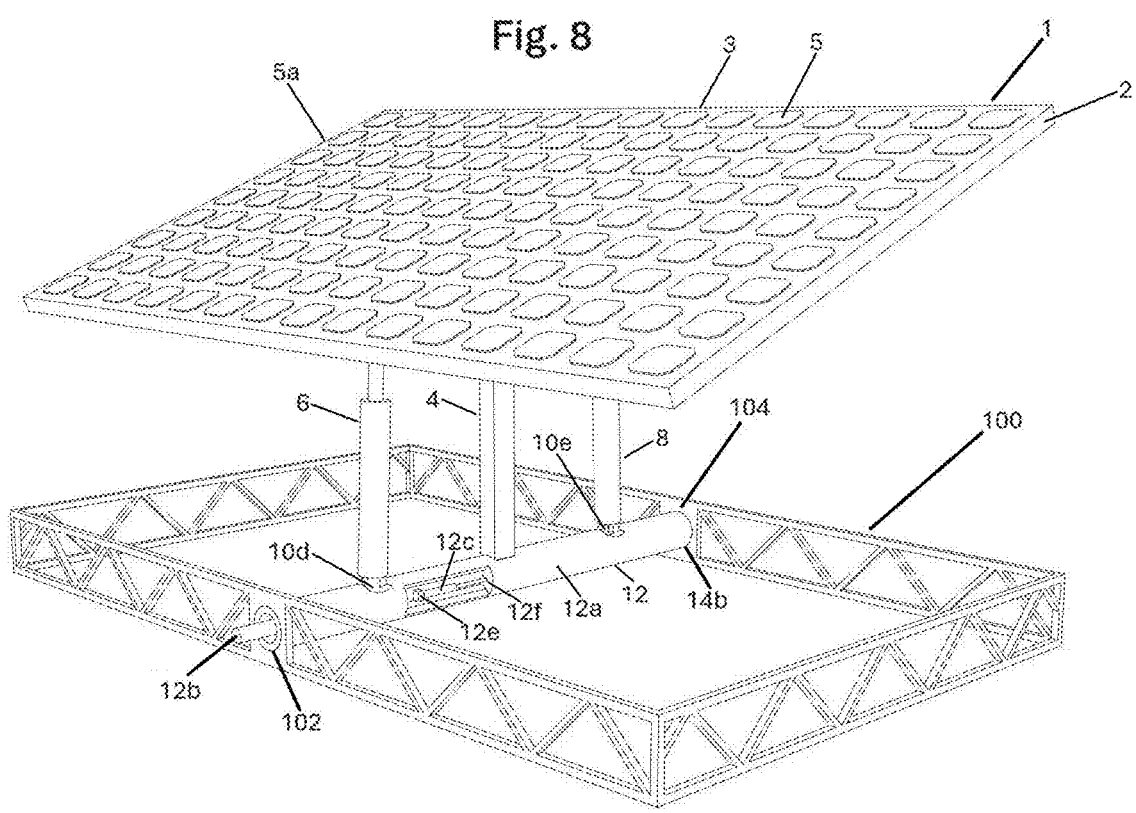

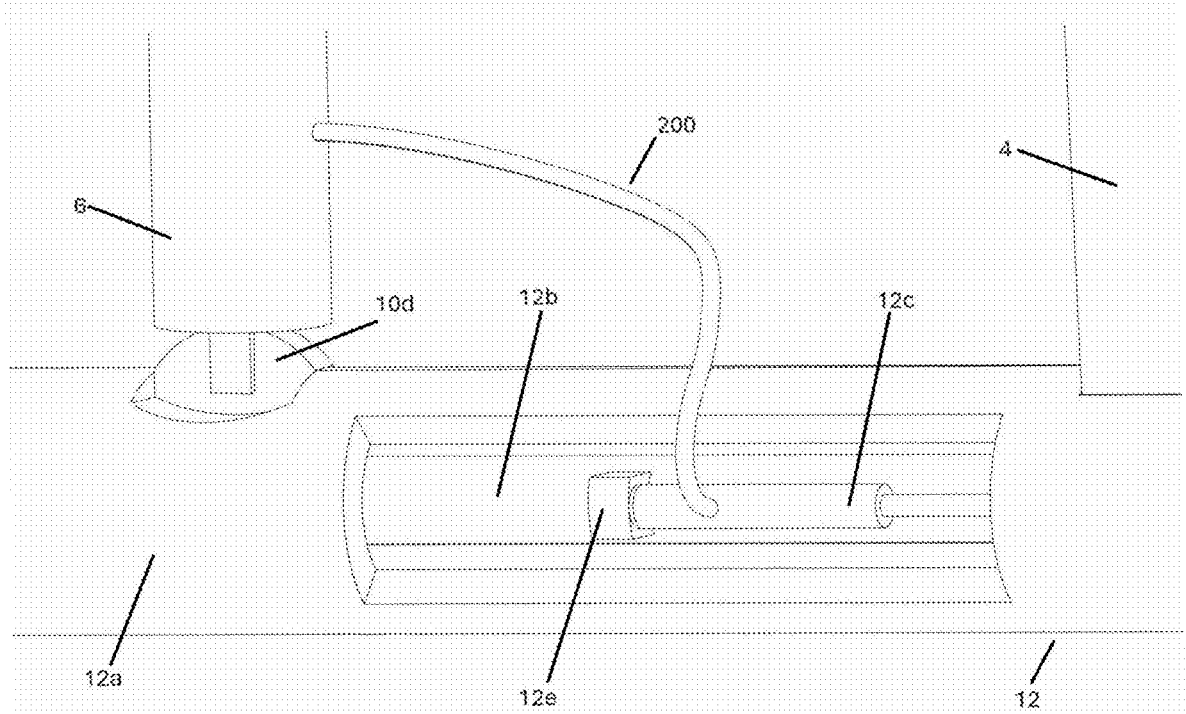

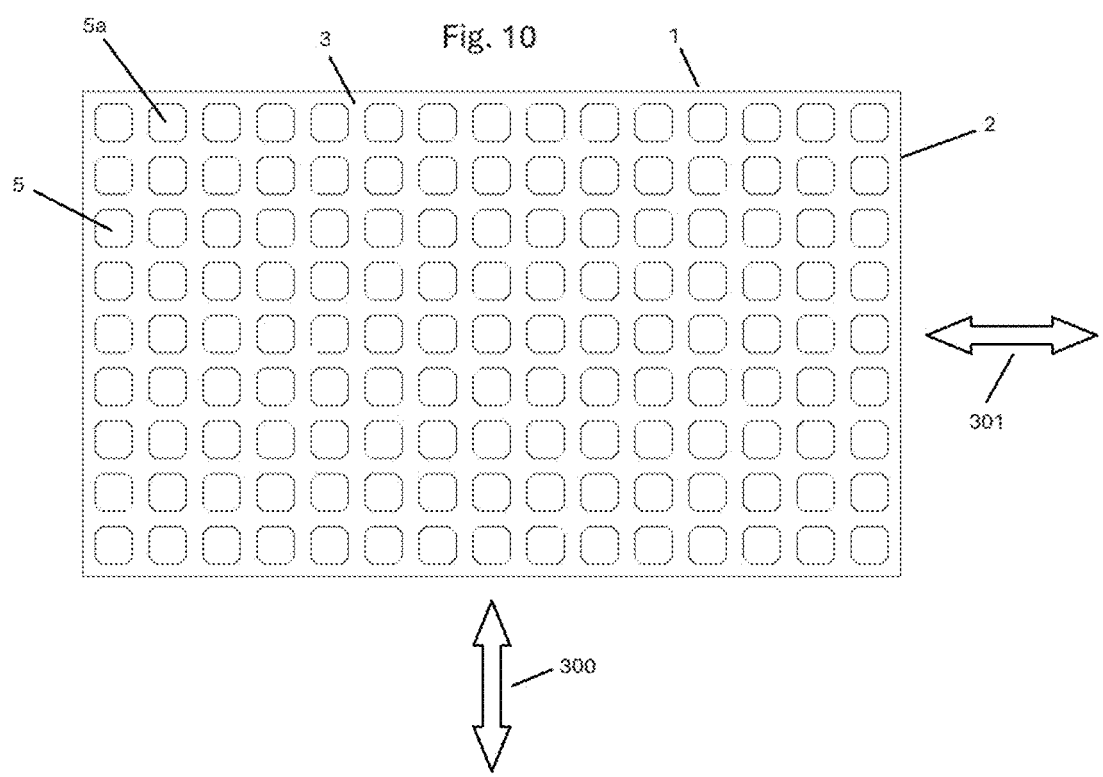

TWO AXIS SOLAR PANEL TRACKING SYSTEM USING ROTATIONAL AND AXIALLY LONGITUDINAL MOTION

FIELD OF THE INVENTION

This invention relates to improved methods and apparatus concerning solar panels.

BACKGROUND OF THE INVENTION

Two-axis solar tracking is known; and is used to increase the amount of sunlight that hits a solar panel. Generally, this is done in the prior art, by positioning a solar panel such that it is normal to the path of the sun's rays. Achieving a true normal position typically requires two axes of movement as the sun's position in the sky changes hourly and weekly (due to seasonal changes). However, prior known two-axis solar tracking methods are typically costly.

A disadvantage of the prior art is one of scalability. The motion of the sun through the sky is a complicated curve throughout the day and even more complicated over seasonal changes. This means the motion required of the solar tracking system must be complicated. This is often accomplished, in the prior art, by a separate motor or actuator for each axis. While each motor or actuator outputs a simple rotary motion they can work in tandem in ways to generate a more complicated curve.

Another known way to accomplish this is to use a reduced number of motors but translate the motion via complicated or costly linkages. This is a more common method as it dramatically reduces the cost of motors.

Both methods have the underlying disadvantage of being costly to scale. Both motors and complicated linkages compound cost (through both initial and maintenance costs) when scaled.

While the costs of adding more motors are obvious, the issues with linkages is not obvious. The motion of the panel itself is fundamentally rotational as it tracks the sun. Transmission of rotational motion over larger distances is costly both in initial and maintenance costs. Transmitting linear (or longitudinal) motion is less costly. However, translation from linear motion to rotational motion is then needed at each panel. This becomes complicated due to the differences in motion on the rising versus lowering sides of the panel.

One solution, offered by U.S. Pat. No. 9,729,102 to Pizzarello et al., which is incorporated by reference herein, is to use a longitudinal actuator and linkages to tilt only one side of the panel while the other side remains tethered to an anchor point (the point about which the panel rotates). It also leaves one panel horizontal in between every panel that tilts. This solves several issues, but introduces common fundamental issues with solar tracking: it creates shade over a portion of the neighboring panel, when tilted it does not effectively use the space in between the tilted panels, and it is a single axis tracking system.

Pizzarello et al. then introduces a specialized lens on the top portion of the rotated panel such that it bends light onto the neighboring panel being shaded. This introduces expensive material while only introducing the amount of light that crosses the lens. That is, the lens spreads out enough light to cover the neighboring shaded panel but does so only using the amount of sunlight which touches a small lens. This spreadout light is then much less dense than that which hits the panel directly.

SUMMARY OF THE INVENTION

One or more embodiments of the present invention provide a novel two axis solar panel tracking system using rotational and linear/longitudinal motion.

A first and principal object of one or more embodiments of the present invention is to provide two-axis tracking for a solar panel using rotational motion and a separate longitudinal motion along the axis of the rotational motion.

Another object of one or more embodiments of the present invention is to allow scalability where the motions of one panel are linked to its neighbors. In this way, the number of drivers of the motion (i.e. motors) are reduced. This reduces cost, installation complexity, and maintenance concerns.

The following operation of the embodiments describes an improvement to existing solar panel tracking systems. It is preferred that all embodiments utilize rotational motion by simple rotation of a cylindrical member. This rotational motion is then directly translated to rotational motion of the solar panel through a rigid member. It is preferred that all embodiments utilize the longitudinal motion of a separate member. This longitudinal motion is translated to rotational motion of the panel through a set of hydraulic cylinders.

Still other embodiments and advantages of the present invention will become readily apparent to those skilled in this art from the following detailed description, which shows and describes differentiating embodiments, simply by way of illustration of the best mode now contemplated of carrying out the invention. As will be realized, the invention is capable of modification in various obvious respects without departing from the invention. Accordingly, the drawings and description of the preferred embodiment are to be regarded as illustrative in nature, and not as restrictive.

In at least one embodiment, an apparatus is provided comprising a solar panel having a first end and a second end, wherein the second end is opposite the first end; a first cylinder having a first end rotatably connected to the solar panel at a first pivot point; a second cylinder having a first end rotatably connected to the solar panel at a second pivot point which is different from the first pivot point; a support beam having a first end rotatably connected to the solar panel at a third pivot point which differs from the first and second pivot points and which is between the first and second pivot points; and a base.

In at least one embodiment, the first cylinder has a second end fixed to the base, wherein the second end of the first cylinder is opposite the first end of the first cylinder; wherein the second cylinder has a second end fixed to the base, wherein the second end of the second cylinder is opposite the first end of the second cylinder; wherein the support beam has a second end fixed to the base, wherein the second end of the support beam is opposite the first end of the support beam; wherein the first cylinder is configured to raise or lower the first end of the solar panel; and wherein the second cylinder is configured to raise or lower the second end of the solar panel.

In at least one embodiment of the present invention, the apparatus further includes a first hydraulic device which is configured to cause the first cylinder to raise or lower the first end of the solar panel; and a second hydraulic device which is configured to cause the second cylinder to raise or lower the second end of the solar panel.

The apparatus may further include a frame; wherein the base is rotatably mounted to the frame; and wherein the base is configured to rotate with respect to the frame. The base may be a pipe.

The apparatus may further include a rigid member which is configured to slide in a first direction with respect to the base and thereby causes the first cylinder to raise the first end of the solar panel and the second cylinder to simultaneously lower the second end of the solar panel; and wherein the rigid member is configured to slide in a second direction, opposite to the first direction, with respect to the base to thereby cause the first cylinder to lower the first end of the solar panel and the second cylinder to simultaneously raise the second end of the solar panel.

In at least one embodiment the base is configured to rotate with respect to the frame along a first axis of rotation; and the raising of the first end of the solar panel and the simultaneous lowering of the second end of the solar panel rotates the solar panel along a second axis of rotation which is perpendicular to the first axis of rotation.

In at least one embodiment, a method is provided which includes raising a first end of a solar panel; and simultaneously lowering a second end of the solar panel, in conjunction with one or more structures as previously described.

BRIEF DESCRIPTION OF THE DRAWINGS

FIG. 8 shows an isometric perspective of an embodiment that contains a frame holding a single panel assembly;

FIG. 9 shows a close up view of the horizontal cylinder and a vertical cylinder connected by a hydraulic line; and FIG. 10 shows a straight on view of the top of the apparatus of FIG. 1 as it is in the position in FIG. 1.

DETAILED DESCRIPTION OF THE DRAWINGS

Figure 1:
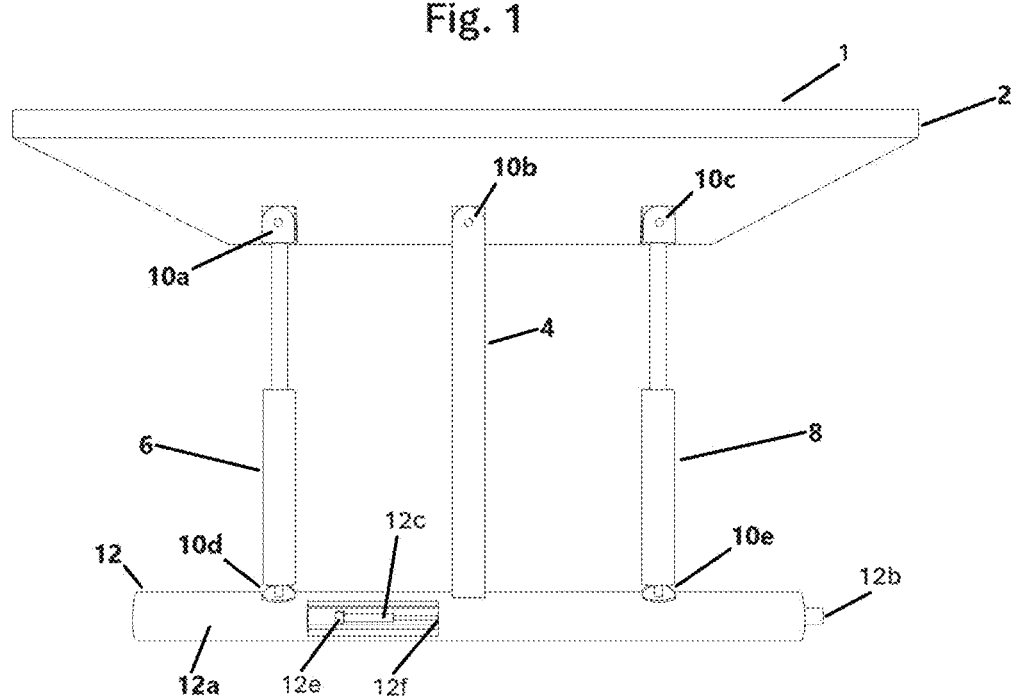
FIG. 1 shows a perspective side view of an apparatus for use in accordance with one or more embodiments of the present invention when a solar panel is in a flat position.

FIG. 1 shows a perspective side view of an apparatus 1 for use in accordance with one or more embodiments of the present invention when a solar panel 2 is in a flat position. The apparatus 1 includes the solar panel 2, a vertical support beam 4, vertically oriented hydraulic cylinders 6 and 8, bearings and related pivot points 10a, 10b, 10c, 10d, and 10e, and rotational actuator 12.

The rotational actuator 12 includes a housing 12a, in which is located a pipe 12b and a horizontally oriented hydraulic cylinder 12c.

Figure 2:
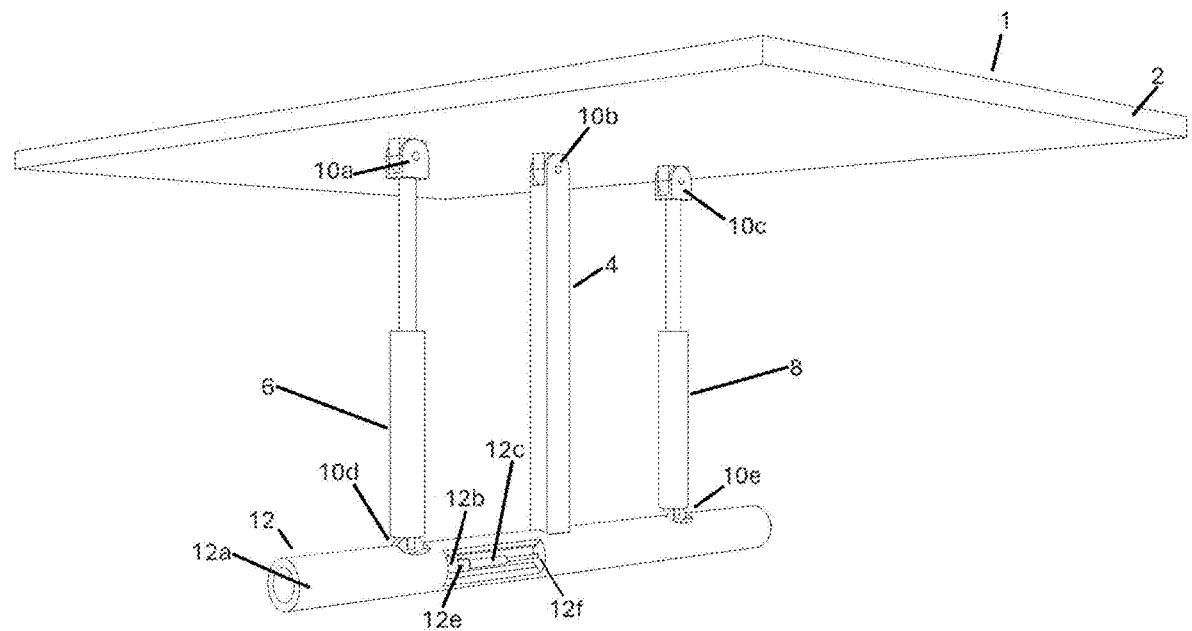
FIG. 2 shows a perspective isometric view of the apparatus of FIG. 1 when the solar panel is in the flat position as in FIG. 1.

FIG. 2 shows a perspective isometric view of the apparatus 1 of FIG. 1 when the solar panel 2 is in the flat position as in FIG. 1.

Figure 3:
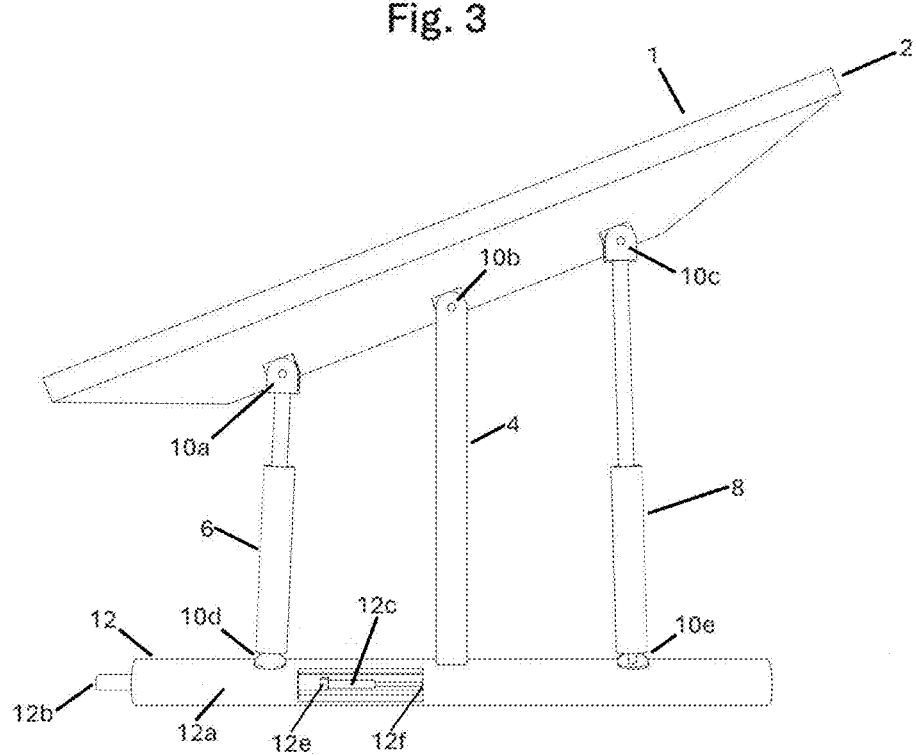
FIG. 3 shows a perspective side view of the apparatus of FIG. 1 when the solar panel is in a rotated position.

FIG. 3 shows a perspective side view of the apparatus 1 of FIG. 1 when the solar panel 2 is in a rotated position.

Figure 4:
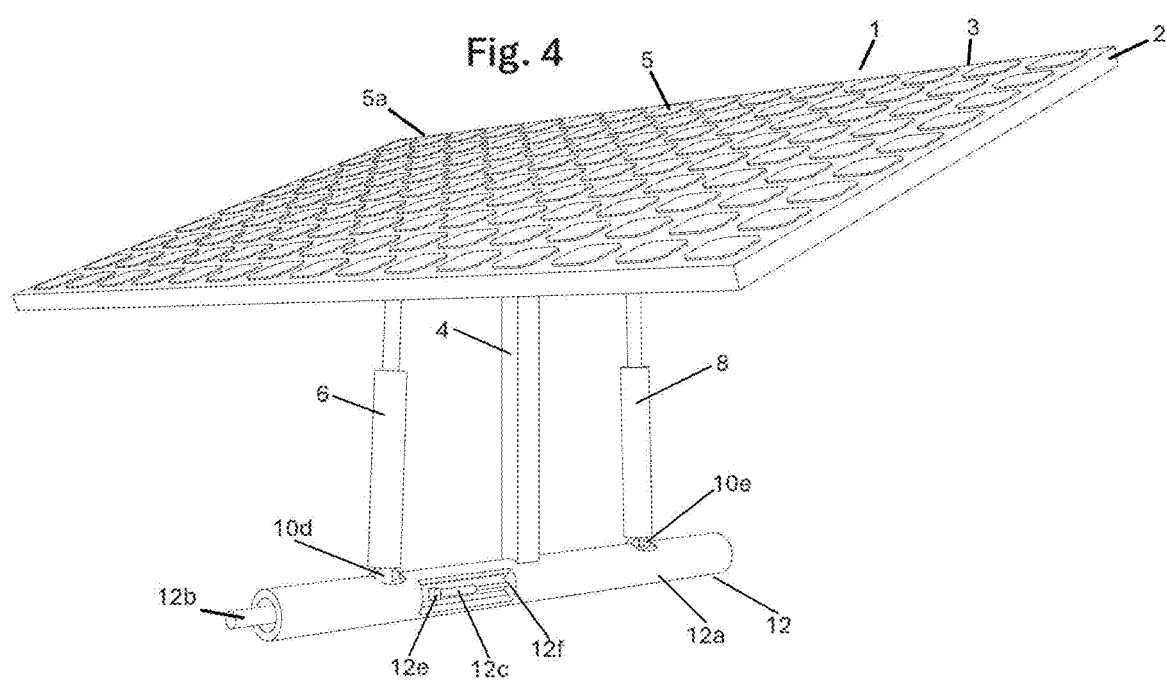
FIG. 4 shows a perspective isometric view of the apparatus of FIG. 1 when the solar panel is in the rotated position as in FIG. 3.

FIG. 4 shows a perspective isometric view of the apparatus 1 of FIG. 1 when the solar panel 2 is in the rotated position as in FIG. 3. In FIG. 4, a top surface 3 of the solar panel 2 is shown, on which is located a plurality 5 of solar cells, including solar cell 5a.

Figure 5:
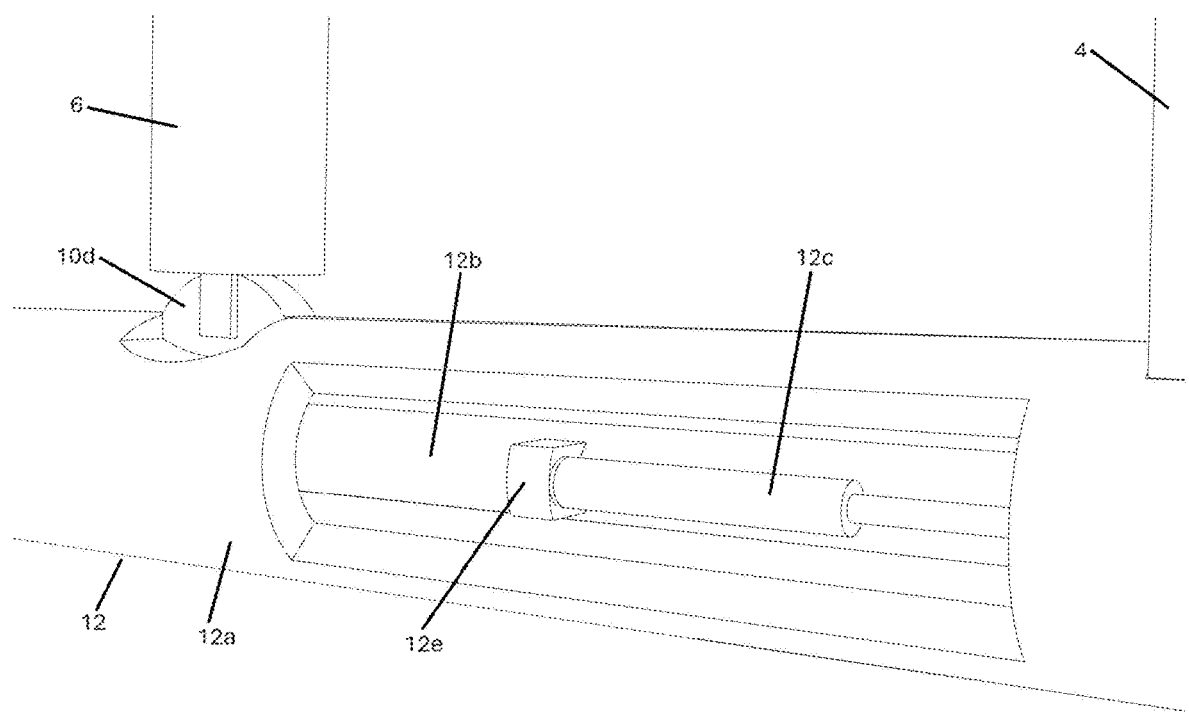
FIG. 5 shows a perspective close up view of a horizontal cylinder and a vertical cylinder.

FIG. 5 shows a perspective close up view of the pipe 12b and the horizontally oriented hydraulic cylinder 12c.

Figure 6:
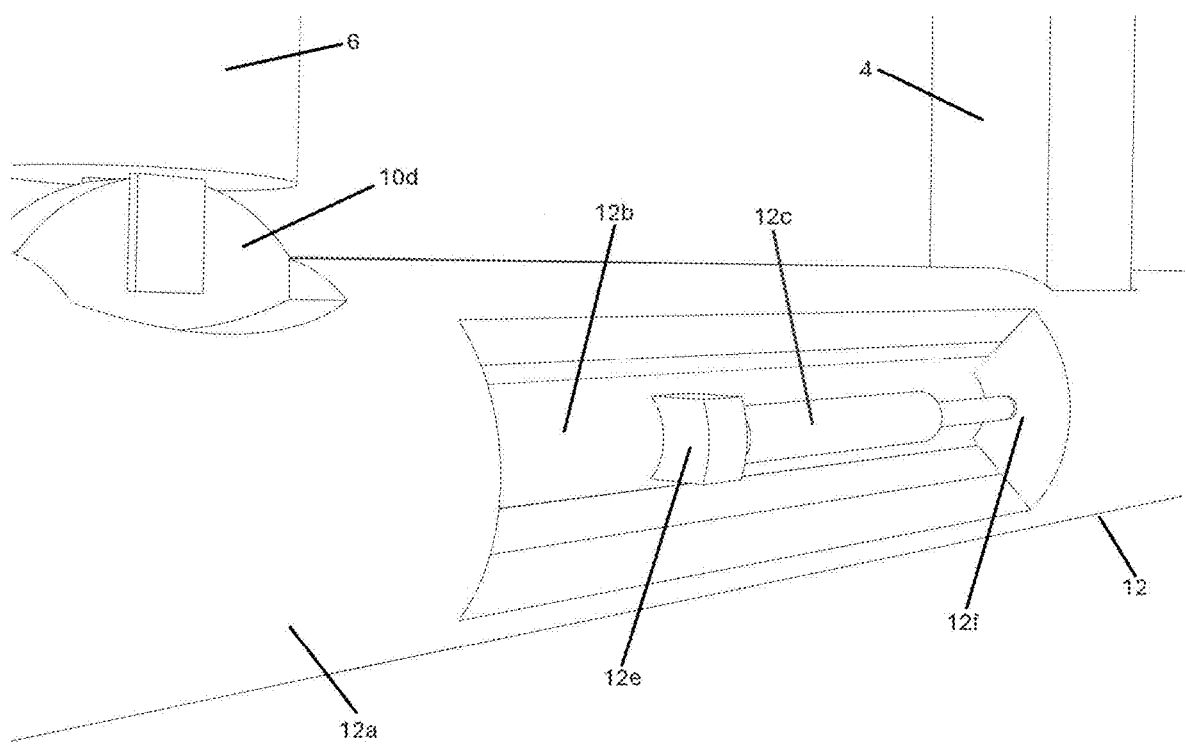
FIG. 6 shows a perspective close up view of the horizontal cylinder connected to an interior linear actuator and an outer rotational actuator.

FIG. 6 shows a perspective close up view of the horizontally oriented cylinder 12c connected to an interior linear actuator 12b and an outer rotational actuator 12

Figure 7:
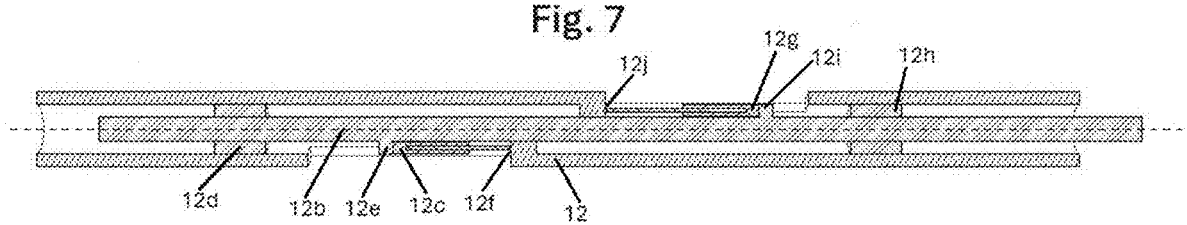
FIG. 7 shows a cross section cut through the center of the interior linear actuator, outer rotational actuator, and the horizontal cylinder.

FIG. 7 shows a cross section cut through the center of the interior linear actuator 12b, outer rotational actuator 12, the horizontal cylinders 12c and 12g, raised tabs 12e and 12i, cutaway sections in the outer rotational actuator 12f and 12j, and bushings 12d and 12h.

FIG. 8 shows an isometric perspective of an embodiment that contains a frame 100 holding a single panel assembly or apparatus 1. The frame 100 may include openings 102 and 104 into which the ends of the housing 12a are inserted.

FIG. 9 shows a close up view of the horizontal cylinder 12a and the vertical cylinder 6 connected by a hydraulic line 200.

FIG. 10 shows a straight on view of the top of the apparatus 1 of FIG. 1 as it is in the position in FIG. 1. In FIG. 10, the top surface 3 of the solar panel 2 is shown, on which is also shown the plurality 5 of solar cells, including the solar cell 5a. FIG. 10 also shows the axis 300 and the axis 301.

In at least one embodiment, the solar panel 2 is connected to the vertical support beam 4 by way of the bearing and/or pivot point 10b in such a way that the panel 2 can tilt on the vertical support beam 4 along one axis. The vertical support beam 4 is connected to the pipe 12a used as a rotational actuator 12 in a rigid manner.

Two vertically oriented hydraulic cylinders 6 and 8 are connected to the pipe 12a by way of bearings and/or pivot points 10d and 10e, respectively. The two hydraulic cylinders 6 and 8 are on the same side as the vertical support beam 4 such that the two hydraulic cylinders 6 and 8 and the vertical support beam 4 are all in line with each other. The other end of each of vertically oriented hydraulic cylinders 6 and 8 is connected to the solar panel 2 using bearing and/or pivot points 10a and 10c.

FIGS. 5, 6, and 9 show a close-up view of a linear actuator 12b and a rotational actuator 12c within the pipe 12a, wherein the linear actuator 12b and the rotational actuator 12c connect with each other. FIG. 7 shows a cutaway view of the rotational actuator 12 and the linear actuator 12b to better show their connectivity. The pipe 12a, having a linear actuator 12b is situated inside of, and is smaller than, the pipe used as a rotational actuator 12c such that there is space between the linear actuator 12b and rotational actuator 12c to allow for bushings 12d and 12h. The bushings 12d ad 12h keep the linear actuator 12b centered inside of the rotational actuator 12a. A portion of the rotational actuator 12a is cut away so as to expose the linear actuator 12b. There are tabs 12e and 12i or raised portion of the linear actuator 12b into the space of the rotational actuator 12a that has been cut away. Horizontally oriented hydraulic cylinders 12c and 12g are connected to the tabs 12e and 12i on the linear actuator 12b on one end and connected to the inside wall of the cut away portion 12f and 12j of the rotational actuator 12a. One of the horizontally oriented hydraulic cylinders 12c is connected to the vertically oriented hydraulic cylinder 6 on the same side by way of a hydraulic hose 200 shown in FIG. 9.

FIG. 8 shows an embodiment of the present invention along with an ancillary support structure 100. The apparatus 1 is configured to be attached to the support structure 100 by way of the housing 12a of the outer rotational actuator 12, being inserted into openings 102 and 104, respectively of the support structure 100.

In operation a two axis solar tracking system, apparatus and method of the present invention tracks the sun by way of the rotational actuator 12 rotating the vertical support beam 4 which is connected to the solar panel 2 to follow the diurnal motion of the sun, and the linear actuator 12b engaging with the horizontal hydraulic cylinders 12c, vertical hydraulic cylinders 6 and 8, and the solar panel 2 to track the seasonal motion of the sun.

The solar panel 2 is connected to the vertical support beam 4 by way of a pivot point 10b in such a way that the panel can tilt on the vertical support beam 4 along one axis. It is through this pivot point 10b that the system tracks the seasonal motion of the sun. The vertical support beam is connected to the pipe 12 used as a rotational actuator 12 in a rigid manner. In this way, when the pipe 12 rotates, so does the solar panel 2. This is how the system will track the diurnal motion of the sun.

One or more embodiments of the present invention contain two vertically oriented hydraulic cylinders 6 and 8 and two horizontally oriented hydraulic cylinders 12c shown in FIG. 5. These four hydraulic cylinders are grouped into two pairs where each pair is one vertical cylinder of cylinders 6 and 8, and one horizontal cylinder 12c. The cylinders in each pair are connected to each other by way of a hydraulic hose 200, shown in FIG. 9. The hydraulic hose 200 is connected to each pair in such a way that each pair becomes a hydraulically closed system. The effect of this is that when one of the cylinders in a pair has the piston pushed in, the other cylinder in that pair has its cylinder pushed out by way of the closed hydraulic system.

The pipe used as a linear actuator 12b is connected to each horizontally oriented hydraulic cylinder 12c, and the other end of each horizontal cylinder 12c is then connected to the pipe used as a rotational actuator 12 in such a way that when the pipe used as a linear actuator 12b is pushed longitudinally relative to the pipe used as a rotational actuator 12 one of the horizontal hydraulic cylinders 12c gets its piston compressed into the cylinder 12 while the other horizontal hydraulic cylinder 12c has its piston pulled out of the cylinder 12. The vertically oriented hydraulic cylinders 6 and 8 are connected to the horizontally oriented cylinders 12c such that one of the pistons is pulled into the cylinder 12 and the other piston is pushed out the same distance at the same time. In this way, the solar panel 2 is made to rotate in the seasonal direction by way of the pipe used as a linear actuator 12b The pipe used as a linear actuator 12b is located inside of at least two bushings 12d . . . . These bushings 12d are then located inside of the pipe used as a rotational actuator 12. The bushing 12d is then used to keep the pipe used as a linear actuator 12b centered inside of the pipe used as a rotational actuator 12, as well as allowing for smooth longitudinal motion. The pipe used as a rotational actuator 12 is keyed inside of the bushing 12d in such a way that the pipe used as a linear actuator 12 is rotationally synchronized with the pipe used as a rotational actuator 12.

In at least one embodiment, the present invention provides an apparatus, method, and/or system for tilting the solar panel 2 in two axes 300 and 301 (shown in FIG. 10) which are perpendicular to each other that utilizes a rotating pipe 12 (shown in FIG. 8) for the axis 300, and a rigid member 12b (shown in FIG. 7) moving longitudinally relative to the rotating pipe 12, and typically within the rotating pipe 12.

The rigid member is connected to hydraulic cylinders 12c and 12g to transfer the linear motion of rigid member 12b by way of the tabs 12e and 12i (shown in FIG. 7) and the cutaway sections 12f and 12j to a positive pressure in one of the hydraulic cylinders 12c and 12g (shown in FIG. 7) and a negative pressure in the other of the pair 12c and 12g. This pressure and negative pressure pairing is then transferred via the hydraulic hose 200 (shown in FIG. 9) to the vertically oriented hydraulic cylinders 6 and 8 which in turn generates a longitudinal motion of the cylinders 6 and 8 such that the solar panel 2 is pushed up by one of the cylinders 6 and 8 and pulled down by the other cylinder of cylinders 6 an 8, which then forces the solar panel 2 to rotate along the axis 301.

In at least one embodiment, the rigid member 12b moving linearly is a rod.

In at least one embodiment, the rigid member 12b moving linearly is a pipe.

In at least one embodiment, the rigid member 12b moving linearly is located along the central axis C1 shown by dashed lines in FIG. 7 of the rotating pipe 12.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus comprising:
a solar panel having a first end and a second end, wherein the second end is opposite the first end;
a first cylinder having a first end rotatably connected to the solar panel at a first pivot point;
a second cylinder having a first end rotatably connected to the solar panel at a second pivot point which is different from the first pivot point;
a support beam having a first end rotatably connected to the solar panel at a third pivot point which differs from the first and second pivot points and which is between the first and second pivot points; and
a base;
wherein the first cylinder has a second end fixed to the base, wherein the second end of the first cylinder is opposite the first end of the first cylinder;
wherein the second cylinder has a second end fixed to the base, wherein the second end of the second cylinder is opposite the first end of the second cylinder;
wherein the support beam has a second end fixed to the base, wherein the second end of the support beam is opposite the first end of the support beam; and
wherein the first cylinder is configured to raise or lower the first end of the solar panel; and
wherein the second cylinder is configured to raise or lower the second end of the solar panel; and
wherein the first ends of the first cylinder, the second cylinder and the support beam are rotatably connected to the solar panel and the second ends of the first cylinder, the second cylinder, and the support beam are fixed to the base so that the first cylinder, the second cylinder, and the support beam are all in line with each other; and further comprising
a frame;
wherein the base is rotatably mounted to the frame; and
wherein the base is configured to rotate with respect to the frame;
wherein the base is a pipe;
wherein the pipe has a length; and
wherein the second ends of the first cylinder, the second cylinder, and the support beam are fixed to the pipe along the length of the pipe, such that the second end of the support beam is between the second end of the first cylinder and the second end of the second cylinder.

2. The apparatus of claim 1 further comprising
a first hydraulic device which is configured to cause the first cylinder to raise or lower the first end of the solar panel; and
a second hydraulic device which is configured to cause the second cylinder to raise or lower the second end of the solar panel.

3. An apparatus comprising:
a solar panel having a first end and a second end, wherein the second end is opposite the first end;
a first cylinder having a first end rotatably connected to the solar panel at a first pivot point;
a second cylinder having a first end rotatably connected to the solar panel at a second pivot point which is different from the first pivot point;
a support beam having a first end rotatably connected to the solar panel at a third pivot point which differs from the first and second pivot points and which is between the first and second pivot points; and
a base;
wherein the first cylinder has a second end fixed to the base, wherein the second end of the first cylinder is opposite the first end of the first cylinder;
wherein the second cylinder has a second end fixed to the base, wherein the second end of the second cylinder is opposite the first end of the second cylinder;
wherein the support beam has a second end fixed to the base, wherein the second end of the support beam is opposite the first end of the support beam; and
wherein the first cylinder is configured to raise or lower the first end of the solar panel;
wherein the second cylinder is configured to raise or lower the second end of the solar panel;
further comprising
a frame;
wherein the base is rotatably mounted to the frame; and
wherein the base is configured to rotate with respect to the frame; and
further comprising
a rigid member which is configured to slide in a first direction with respect to the base and thereby causes the first cylinder to raise the first end of the solar panel and the second cylinder to simultaneously lower the second end of the solar panel;
and wherein the rigid member is configured to slide in a second direction, opposite to the first direction, with respect to the base to thereby cause the first cylinder to lower the first end of the solar panel and the second cylinder to simultaneously raise the second end of the solar panel.

4. The apparatus of claim 3 wherein
the base is configured to rotate with respect to the frame along a first axis of rotation; and
wherein the raising of the first end of the solar panel and the simultaneous lowering of the second end of the solar panel rotates the solar panel along a second axis of rotation which is perpendicular to the first axis of rotation.

5. An apparatus comprising:
a solar panel having a first end and a second end, wherein the second end is opposite the first end;
a first cylinder having a first end rotatably connected to the solar panel at a first pivot point;
a second cylinder having a first end rotatably connected to the solar panel at a second pivot point which is different from the first pivot point;
a support beam having a first end rotatably connected to the solar panel at a third pivot point which differs from the first and second pivot points and which is between the first and second pivot points; and
a base;
wherein the first cylinder has a second end fixed to the base, wherein the second end of the first cylinder is opposite the first end of the first cylinder;
wherein the second cylinder has a second end fixed to the base, wherein the second end of the second cylinder is opposite the first end of the second cylinder;
wherein the support beam has a second end fixed to the base, wherein the second end of the support beam is opposite the first end of the support beam;
wherein the first cylinder is configured to raise or lower the first end of the solar panel;
wherein the second cylinder is configured to raise or lower the second end of the solar panel;
wherein the base is a pipe;
wherein the pipe has a length; and
wherein the second ends of the first cylinder, the second cylinder, and the support beam are fixed to the pipe along the length of the pipe, such that the second end of the support beam is between the second end of the first cylinder and the second end of the second cylinder.

* * * * *